July 3, 1956     C. E. RICK     2,753,254
METHOD OF PRODUCING REFRACTORY METAL
Filed Oct. 29, 1952     2 Sheets-Sheet 1
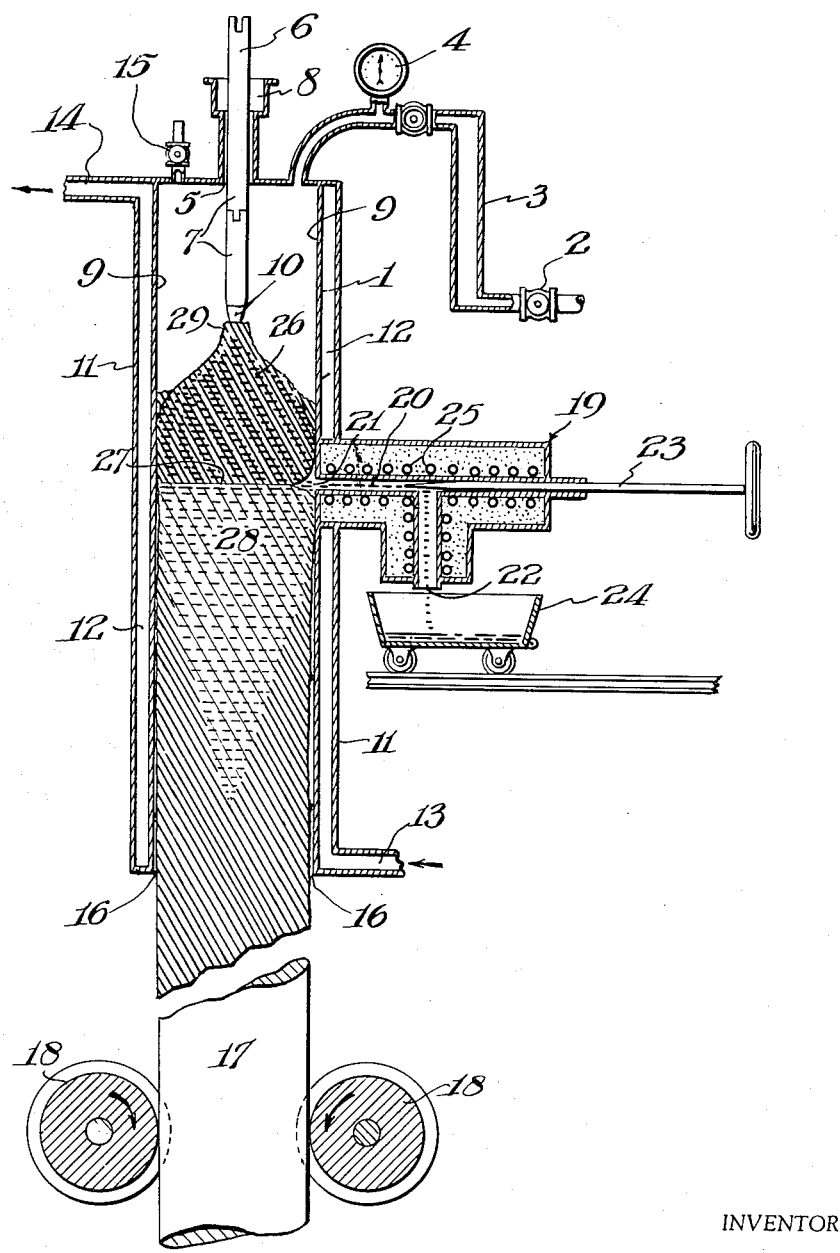
INVENTOR
CHRISTIAN E. RICK
BY
ATTORNEY

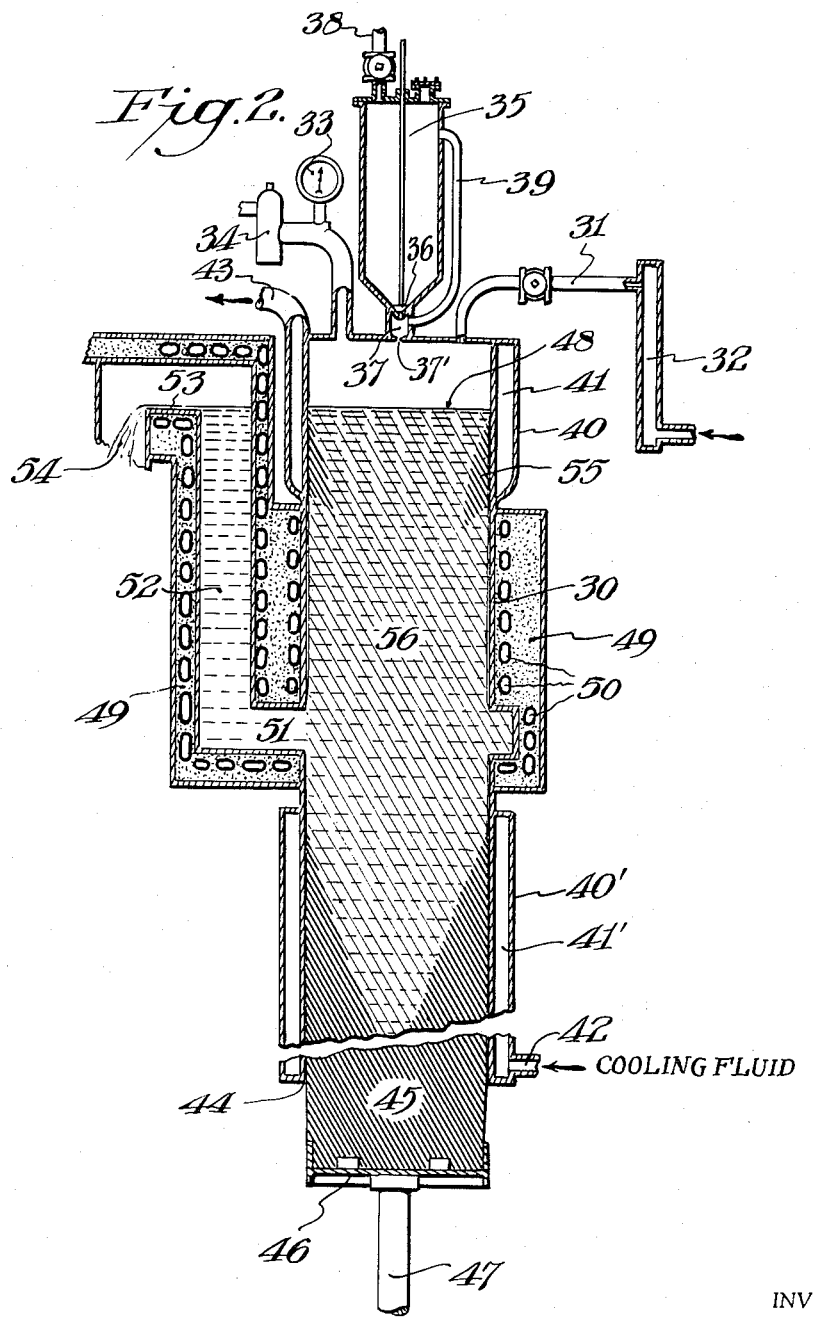

United States Patent Office 2,753,254
Patented July 3, 1956

2,753,254
METHOD OF PRODUCING REFRACTORY METAL

Christian E. Rick, Wilmington, Del., assignor to E. I. du Pont de Nemours and Company, Wilmington, Del., a corporation of Delaware Application October 29, 1952, Serial No. 317,443

12 Claims. (Cl. 75—84)

This invention relates to refractory metal production and more particularly to the production of metals in relatively pure, elementary state, through reduction of their volatile halides with an active reducing metal. More specifically, the invention relates to novel methods for preparing a titanium metal sponge reaction product in relatively dense form and controlled composition, by reduction of a chloride of said metal at an elevated temperature and in a closed reactor with a reducing metal such as magnesium.

Elementary titanium, a representative metal adapted to be produced hereunder, is industrially important because of its unique combination of good properties, including high strength combined with light weight and high melting point. To be satisfactorily useful commercially, it must have a degree of ductility enabling it to be readily forged, rolled, and otherwise worked. This ductility is obtained by preparing the metal in a relatively high state of purity, e. g., essentially free of non-metallic elements such as carbon, oxygen, hydrogen, and nitrogen. In preparing the metal, a halide thereof such as $TiCl_4$ is reduced within a reactor with magnesium, calcium, or sodium, etc., the reaction being carried out in a batch operation with air or water being excluded from the reactor. Among examples of reduction procedures of this type, those of U. S. Patents Nos. 2,205,854 and 2,148,345 can be mentioned. In such methods, the titanium tetrachloride is brought into contact with molten magnesium in the reactor under an elevated temperature and an inert atmosphere, the ensuing reaction producing molten magnesium chloride and titanium metal in porous, sponge-like form. The reduction products are removed from the reactor and processed in accordance with various procedures to obtain the pure titanium. One of the first steps following the reaction is to drain away from the sponge as much of the magnesium chloride as possible. The remainder is then leached or vacuum distilled off to leave the ductile titanium sponge which can be later ground up and melted into ingots. Due to the relative volume of the reaction products, the initial titanium sponge occupies only about 11% of the space in the reactor, the remainder of the space being occupied by the magnesium chloride. This inefficient use of reactor space has caused some concern, and in an attempt to improve the yield per cubic foot of reactor space, recourse has been made to draining of the magnesium chloride from the sponge while the latter is still in the reactor but after completion of the reaction. More reactants are then introduced and the reaction is repeated in the interstices of the initially formed sponge. From this operation there is obtained more titanium product per batch per unit volume and a denser type of sponge, but disadvantageously the second reaction is considerably slower than the first with the result that the overall advantage gained becomes very dubious.

In the copending applications of C. H. Winter, Jr., Ser. No. 213,879, filed March 5, 1951, and C. H. Winter, Jr. and E. L. Anderson, Ser. No. 255,372, filed November 8, 1951, highly useful and improved methods for continuously preparing titanium and other refractory metals are disclosed. In such procedures, the titanium sponge and by-product magnesium chloride are withdrawn continuously from the reactor as a frozen, solidified ingot. While these processes afford real and meritorious advances in the art and provide effective, continuous type metal producing operations, only a relatively small (also about 11%) amount of the ingot volume is occupied by the titanium. Additionally, the relatively low thermal conductivity of the by-product metal salt ($MgCl_2$) affords a very slow freezing rate in relatively large diameter ingots. A need thus exists for an improved method from which a relatively denser form of ingot with a higher ratio of metal to salt and increased freezing rate can be readily obtained, and which, advantageously, will inherently facilitate substantially continuous ingot withdrawal from the reactor and increase metal yield and recovery from a given reduction operation.

It is among the objects of this invention to overcome the foregoing and other disadvantages characterizing prior reduction methods for producing refractory metals, and especially in the production of titanium metal through reduction of titanium tetrachloride with magnesium. A further object is to provide novel methods and means for obtaining, especially from the procedures disclosed in said copending applications Ser. Nos. 213,879 and 255,372, a denser form of titanium metal sponge reaction product and which exhibits improved cooling characteristics. A particular object is to provide a novel method for separating as much as 90–92% of the by-product halide salt from said titanium metal sponge and in which recovery can be effected of a metal reaction product possessing a bulk density in excess of 50% of the normal metal density. A further particular object is to obtain higher metal-to-salt ratio types of ingot in continuous methods of the types disclosed in said copending U. S. applications Ser. Nos. 213,879 and 255,372. An additional object is to improve the cooling characteristics of solid ingot products recoverable from reduction procedures of the type herein referred to. Other objects will be evident from the ensuing description and from the accompanying, diagrammatic drawings wherein Fig. 1 is a vertical, sectional view of one useful form of apparatus in which the invention can be carried out; and Fig. 2 is a vertical, sectional view of another form thereof.

These and other objects and advantages are realized in this invention which comprises producing a relatively pure refractory metal by reducing a volatile metal halide with an active reducing metal in a closed reactor, effecting the reduction reaction at a temperature above the melting point of the reducing metal and reaction by-product metal salt which forms, during said reduction controlling the density of the sponge metal reaction product to be recovered by maintaining a predetermined level of by-product salt in said reactor through the maintenance of a fluid communication between reaction zone molten by-product salt and a molten salt exit port therefor, controlling the rate of withdrawal of said sponge metal in solid state from said reactor, and recovering the metal component in relatively pure condition from the withdrawn product.

In a more specific embodiment, the invention comprises a continuous process for obtaining a relatively dense sponge metal reaction product adapted to yield greater recovery of titanium or other refractory metal, which comprises subjecting a volatile titanium or other metal chloride to reduction at temperatures ranging from about 750–1450° C. with an active reducing metal, such as magnesium, in a closed reaction zone while maintaining the walls of the reaction vessel at a temperature below the melting point of by-product metal chloride formed so that continuous withdrawal can be effected of sponge metal reaction product from said vessel, effecting said reduction by charging the reducing metal as a continuous, solid rod into an atmosphere of the metal chloride reactant and out of contact with the internal walls of said vessel, throughout the reduction maintaining metal chloride by-product salt formed at a relatively constant level within said vessel to control and increase the density of the sponge metal being produced, maintaining the reaction zone molten salt in fluid communication with a molten salt exit port in said vessel, and controlling the rate of withdrawal of the sponge metal product in association with a portion of the by-product salt in solid form, and recovering the metal component in relatively pure condition from the withdrawn sponge.

Referring to Fig. 1, illustrative of one preferred form of apparatus for practicing the invention, there is shown an upright, cylindrical type reaction vessel 1 from which, during a reduction, air or other undesired gaseous contaminants can be readily excluded. The reactor 1 is preferably constructed of corrosion-resistant metal or alloy inert toward reactants used and reaction products formed in the process, and also is capable of withstanding any desired relatively high temperature and pressure. In the upper portion of the reactor a valved inlet conduit 2 is provided through which a metal halide reactant such as TiCl₄, in liquid or vaporous state, can be readily introduced. Suitably interposed in said conduit is a conventional metering or measuring device 3 and a pressure gauge 4 for regulating and controlling the amount of halide reactant to be fed to and the pressure which is to prevail in the system. A separate inlet 5, through which a reducing metal 6 in the form of a solid, continuous rod, stick, or bar can be manually or mechanically charged to the system, is provided in the top substantial central portion of the reactor, the rod 6 being made up, if desired, of a plurality of interconnected section members 7. A conventional sealing element 8, such as a neoprene gland or stuffing box, or in the form of an inert gas chamber, can be operatively associated with the inlet 5 and the rod 6 in order to prevent contaminants from entering into or reactants escaping from the reactor. As shown, the bar 6 depends from the inlet 5 downwardly through the central portion of the reactor and is maintained out of contact with the reactor internal walls 9 to terminate in a reaction zone 10 wherein the lowermost tip or end portion of the bar is preferably maintained throughout the reduction reaction. Suitably disposed in spaced relationship about the exterior side walls of the reactor is a metal jacketing element 11 adapted to form a fluid passage 12 having an inlet 13 and an outlet 14 through which passage a liquid or gaseous cooling fluid can be continuously charged to effect cooling of said walls and maintain them at any desired cool state of temperature for a purpose to presently appear. A suitable valve-controlled vent element 15 is also provided in the top of the reactor 1, said element functioning to effect removal of purging or other gases from the interior of the reactor prior to commencement of the reduction operation. An outlet 16 is provided in the bottom of the reactor through which solidified products of reaction 17 can be continuously or intermittently withdrawn from said reactor by means of retractor rolls 18 or other suitable type of withdrawing mechanism.

To control and maintain the by-product metal halide salt formed in the reduction at a predetermined, preferably constant, level, within the reactor, liquid level control means 19 is provided, being cooperatively associated with said reactor at a point substantially intermediate the length thereof. The means 19 comprises, as shown, a substantially T-shaped element in which a withdrawal conduit 20 having an inlet 21, and a discharge outlet 22, is provided. The inlet 21 communicates directly with the interior of the reactor and a tapered or other form of manually or mechanically movable piercing element 23 is suitably disposed for rotary and reciprocal movement within the conduit 20 so that said conduit and inlet can be maintained in open communication with the interior of the reactor and the outlet 22 in event said inlet and conduit become plugged or clogged during the reduction operation. The outlet 22 can discharge into a suitable mold or storage receptacle, or, as shown, into a collecting vessel 24 of the conveyor type. To maintain the conduit 20, inlet 21, and outlet 22 at a temperature which will afford ready withdrawal of by-product salt in molten condition from the interior of the reactor, an electrical or other form of suitable heating element 25 can be suitably disposed about or otherwise associated with said conduit, inlet, and outlet.

In utilizing an apparatus of the type just described to produce titanium metal by reduction, for example, of TiCl₄ with a metal such as magnesium, the reactor 1 is first closed off from the atmosphere by sealing its outlet 16 as by inserting into said outlet a closure and retractor plate (not shown) carrying an electrical heating element (also not shown) and to a point immediately below the inlet 21 of the associated level control means 19. Water or other suitable media at a temperature of about 150–155° C. can then be charged for continuous passage through the channel 12 via inlet 13 and outlet 14 of the jacketing element 11 to externally cool the reactor walls 9 and maintain them throughout the reduction preferably at a temperature below the melting point of by-product metal halide salt which forms and to produce a solidified ingot 17. The reactor is then suitably freed of air or like contaminants as by purging with small amounts of vaporized TiCl₄ from the inlet 2. At the conclusion thereof, TiCl₄ addition is continued at a rate to provide a substantially constant pressure of about 5 pounds per square inch gauge during the reduction. The insertclosure plate is then suitably activated until a reactor temperature of about 800° C. is reached. Magnesium metal, in the form of feed rod 6, is then lowered through inlet 5 and the TiCl₄ atmosphere until the tip or end portion thereof comes in direct contact with the hot plate. Said tip portion becomes heated to an ignition temperature, melting of the magnesium reactant ensues, and a self-sustaining reaction between the molten magnesium and TiCl₄ vapor thereupon occurs. As this reaction proceeds, the rod tip is consumed to require a periodic or continuous adjustment of the rod to maintain its end portion within or adjacent to the reaction zone 10 during the reduction. The resulting dense titanium metal sponge product obtained forms out of contact with the walls of the reactor and, preferably, as a tapered, mound-like columnar mass 26 maintained above a relatively constant level 27 of a zone 28 of solid metal and liquid metal halide by-product salt through means of a controlled withdrawal rate of the ingot 17, said rate, in relation to the production rate of titanium metal, being in accordance with the formula:

$$W = \frac{P/A}{62.4 D_M} \times \frac{\frac{mQ}{d_M} + \frac{nS}{d_{NX_y}}}{\frac{mQ}{d_M}}$$

where:

$W$ = withdrawal rate in feet per hour
$P$ = metal production rate in pounds per hour
$A$ = area of the ingot cross-section in square feet
$D_M$ = specific gravity of the product metal
$m$ = pound equivalents of metal produced per hour
$Q$ = equivalent weight of metal product $n$ = pound equivalents of by-product salt entering ingot per hour
$S$ = equivalent weight of by-product salt
$d_M$ = the density of product metal in pounds per cu. ft.
$d_{NX_y}$ = the apparent density of the by-product salt in pounds per cubic foot W is effective over the range where $n/m$ is less than one and preferably between .7 and .2.

As the mass 26 forms and builds up within the reactor, its apex 29 will lie, as shown, substantially in the reactor center immediately below the reaction zone 10 and the lower end or melting tip of rod 6. As by-product halide salt forms, it flows downwardly and outwardly from said apex and over said mass, accumulating as a pool 28 below the level of the overflow or efflux port 21. As the mass 26 rises, the extent of its height within the reactor is governed and regulated through controlled rate of ingot withdrawal already referred to. That is, initially downward movement of the mass toward reactor outlet 16 will be effected by controlled withdrawing of the closure plate releasably secured to the bottom or ingot-forming portion of the mass, and subsequently by removal of the mass as a solid retractible (due to shrinkage on cooling) ingot 17 when suitable engagement with the retractor mechanism or rolls 18 is brought about. Maintaining the substantially constant level 27 and a free passage for removing molten salt efflux through port 21 and outlet 27 is effected by suitably manipulating or adjusting the valve-functioning slideable tapping rod 23 in the passage 20 of the level control means 19, the sharp point or piercing portion of which rod serves to rupture and to eliminate any undesired thin wall of solidified by-product formed the presence of which might result in plugging of said passage and inlet. After withdrawal, the titanium metal content of the ingot is recovered and advantageously refined by conventional purification operations, including vacuum heat treatment, to recover high-grade titanium metal. Alternatively, it may be ground or milled to granular state and leached to remove undesired salt impurities. The separated metal granules can then be consolidated by melting or employed in the manufacture of various metal alloys. If desired, the recovered metal can be shaped into ingots, briquettes, sheets, or otherwise suitably fabricated or alloyed, all in accordance with known procedures.

In the modified form of apparatus shown in Fig. 2, an alternative type of reduction apparatus is provided, in which, particularly, the upper and lower portions of the reactor are subjected to suitable external cooling, while an intermediate portion thereof is suitably enclosed within a heating element having an associated liquid level control and by-product metal halide overflow withdrawal unit. Thus, referring particularly to Fig. 2, there is shown an upright, cylindrical or other form of corrosion-resistant metal reactor 30 in the top upper portion of which a valved inlet conduit 31 is provided, whereby regulated amounts of a metal halide reactant can be charged into said reactor via a suitable metering device 32. Also disposed in said top portion of the reactor is a pressure gauge 33 and an associated relief or venting means 34 whereby any desired pressure can be maintained in the reactor. A storage vessel or reservoir 35 for retaining a suitable reducing metal for employment in the reduction is also disposed in the top portion of the reactor, said reservoir being provided with a suitable outlet 36 which exits into an inert gas-containing protective chamber 37 having an outlet 37' which directly communicates with the interior of the reactor. A valved conduit 38 for charging an inert gas such as argon, helium, or the like, into the reservoir 35 to maintain an inert atmosphere therein, is situated in the top of said reservoir, and in addition a separate inert gas-conveying conduit 39 issues from the top portion of said reservoir and discharges into the chamber 37 whereby an inert atmosphere can also be maintained within that chamber. Disposed in spaced relationship about the upper and lower exterior side wall sections of the reactor 30, a plurality of metal jacketing elements 40 and 40' is provided whereby suitable fluid passages 41 and 41', respectively, are formed through which from an inlet 42 a suitable liquid or gaseous cooling medium can be charged and ultimately discharged from said passages through an outlet 43. A reactor outlet 44 is provided in the bottom of the reaction vessel 30 through which outlet metal sponge reaction products in the form of a solidified ingot 45 can be withdrawn for recovery. For purposes of effecting the withdrawal of said ingot at any desired controlled rate, a closure plate 46 adapted to be inserted into the reactor upon commencement of a given reduction is provided, said plate being adapted to be secured to the bottom of said ingot and carrying a rod, cable, or other form of withdrawing means 47 suitable for communicating with a source of power (not shown). Alternatively, ingot withdrawal can be accomplished by resort to other forms of retractor mechanism such as the retractor rolls hereinabove referred to in the description of Figure 1.

To maintain a liquid level 48 substantially constant within the reactor during a reduction, an external section of the reactor, particularly that lying intermediate the jacketing elements 40 and 40', is enclosed within an insulated electrical or other form of furnacing means 49 provided with suitable heating elements 50. Said furnacing means is also disposed about a lateral outlet 51 of the reactor maintained in open communication with a vertical standpipe or duct 52, the upper extremity of which terminates in an overflow or liquid level controlling wall 53 leading to a discharge outlet 54 which communicates with a collecting or storage vessel (not shown).

In adapting to practice the just-described Fig. 2 type of apparatus in reducing, for example, titanium tetrachloride with a reducing metal such as sodium, all reactor outlets are first sealed off from the atmosphere, closure of the bottom outlet 44 being brought about by insertion of the closure-retractor plate 46 therein. Such plate is introduced up to a point immediately above the upper limit of the heating element 30 and into a relatively cool zone of the reactor due to the circulation of a cooling fluid at 150° C. through the upper jacketing element 40. The retraction rod 47, the lower portion of which is suitably threaded for the purpose, is sealed by applying a conventional type of gland (not shown) thereover at the bottom of the reactor so that titanium tetrachloride escape will be prevented during the starting-up period. The reaction chamber above the insert plate is then filled with $TiCl_4$ vaporized after passage through the flow meter 32. Heating elements 50 are then activated until the reactor plate and reaction chamber attain a temperature of about 700° C. Molten sodium, held at about 500° C. in the feed reservoir 35 and blanketed by argon from the inlet 38 and the conduit 39 leading to the protective chamber 37, is then admitted to the reaction chamber and the desired reduction reaction commences on the hot plate 46. A reaction zone is soon established in the upper, cooled wall section of the reactor, titanium metal product forming becoming strongly adhered to the hot plate in admixture with by-product sodium chloride. The products thus formed solidify as a ring 55 due to contact with the cooled reactor walls. Upon initiation of the reaction, heating elements 50 are turned off and the reaction is then maintained at a relatively slow rate until the heated sections of the walls of the reactor cool to a temperature below the melting point of sodium chloride. The ingot withdrawal mechanism comprising the retractor plate 46 and rod 47 is then brought into operation, its rate of movement being gauged by the $TiCl_4$ feed rate and the cross-sectional area of the reactor, i. e., the $TiCl_4$ feed rate is translated in terms of the theoretically equivalent quantity of titanium metal being produced. Upon setting the initial withdrawal rate, that rate is maintained until the ingot descends below the heated section of the reactor and into the lower cooled portion thereof which is enclosed within the jacketing element 40'. Thereupon, heating elements 50 are reactivated with the result that fluidation of the sodium chloride present in the reaction mass occurs to form a molten mass of that by-product together with solid titanium metal in the region 56. When molten sodium chloride appears in the standpipe 52, the rate of sodium feed is increased until by-product sodium chloride overflows the level 53 and into outlet 54 to indicate establishment of a level 48 within the reactor. From that point on, the withdrawing operation of the process is based upon the $TiCl_4$ feed rate, that is, the amount of sodium charged to the reactor is at the rate necessary to provide a certain $TiCl_4$ requirement known from experience to be commensurate with the size of the equipment used. As in the instance of the Fig. 1 operation, a dense form of titanium metal ingot is recovered from this modification of the process which, when subjected to conventional purification treatments, affords recovery of a pure ductile form of titanium metal.

To a clearer understanding of the invention, the following specific examples are given. These are merely illustrative of and not to be construed as limiting the underlying principles of the invention.

*Example I*

Employing a Fig. 2 type of apparatus comprising a vertical, cylindrical reactor 25 feet in length and having a 15-inch internal diameter or a cross-section of 1.22 square feet, titanium tetrachloride was reduced with sodium metal. The reactor was initially closed off to the atmosphere by inserting the retractor plate 46 through the bottom outlet and to a point just above the upper limits of the surrounding heating element 49. Water under pressure and at about 150° C. was circulated through the channels 41 and 41' to maintain the jacketed reactor wall sections in cooled condition. Small amounts of titanium tetrachloride vapor were then admitted into and vented from the reactor until all air had been purged therefrom, addition of the vaporous $TiCl_4$ being continued thereafter to maintain an atmosphere of that reactant throughout the reduction. The heating elements 50 of the furnacing means were then activated to provide a reactor temperature of about 700° C. at which point molten sodium was charged therein from reservoir 35 through the valved inlet 36 which was set at 3 pounds per square inch. Reaction between the $TiCl_4$ and sodium then took place with establishment of a reaction zone in the upper cooled wall section of the reactor. Upon by-product sodium chloride in admixture with titanium sponge reaction product solidifying as a ring 55, the heating was discontinued and the reaction was then maintained at a slow rate until the walls of the section of the reactor surrounded by said heating means cooled down to a temperature below the melting point of the sodium chloride by-product. The withdrawal mechanism was then put into operation and at a rate gauged by the $TiCl_4$ feed rate and cross-sectional area of the apparatus. With the sodium feed regulated at about 70# per hour, $TiCl_4$ was consumed at 145# per hour to result in a calculated Ti production of approximately 36.6 pounds per hour or .129 cu. ft. Ti per hour. The theoretical amount of NaCl produced was 178#/hr. or 1.32 cut. ft. per hour. The total volume of ingot produced per hour was therefore 1.449 cu. ft. Accordingly, the initial withdrawal rate was set at 1.449/1.22 or 1.19 ft. per hour and maintained at that rate until the ingot extended below the heated section or zone of the reactor. This rate was continued while the heating elements were again activated to render the sodium chloride fluid in the region 56. Upon the appearance of molten NaCl in the pipe 52, the Na feed rate was increased until overflow indicated that a level 48 was established in the reactor. Thereafter, the operation was based on the $TiCl_4$ feed rate. From the figures given, the normal ingot would have .0347/.3897 or about 8.9% of its volume occupied by titanium. $TiCl_4$ consumption was then raised to 290# per hour, equivalent to 73.2# Ti per hour. By reducing the general formula previously given for calculating retraction rate (W) to the specific case for $TiCl_4$ reduction by Na and selecting a value of 0.3 for the ratio $n/m$, there is obtained, since $m=73.2/12$ or 6.1 making $n=1.83$, $$W = \frac{73.2}{1.22 \times 283} \times \frac{\frac{6.1 \times 12}{283} + \frac{1.83 \times 58.45}{135}}{\frac{6.1 \times 12}{283}}$$

or $W=0.87$ ft./hr.

The withdrawal rate was then set at 0.87 ft./hr.

The foregoing operation continued for 6 hours, the reaction being stopped by turning off reactant feed and flooding the reactor with argon. Withdrawal of the ingot was continued until it had receded past the side arm inlet 51 and the heat had been turned off. After the reaction products had cooled, the ingot was removed and a section (weighing 360 pounds) corresponding to the second and third hours of the 0.87 ft./hr. rate was cut out and wrapped in a moistureproof plastic film. This section was transferred to a vacuum type of purification retort. After treatment at 10 microns mercury pressure and 1000° C. in such retort, the product was cooled and recovered and found to consist of ductile titanium of 99.6% purity weighing 139 pounds. Since the average $TiCl_4$ consumed over this period was 590# corresponding to 146.5 pounds of titanium, an actual yield of 94.8% was had. The titanium loss is accounted for in lower chlorides such as $TiCl_3$ and $TiCl_2$ vaporized during vacuum treatment and were subject to later recovery. The sample segment comprising 2.13 cu. ft. contained .49 cu. ft. of titanium or 23.0 volume per cent.

*Example II*

Employing an apparatus of the type shown in Fig. 1, having the same dimensions as the apparatus employed in Example I, titanium tetrachloride was reduced in a continuous process by reaction with magnesium metal and without recourse to argon or other inert gas use. Prior to the reduction, the apparatus was closed off from the atmosphere, purged, wall-cooled, and an atmosphere of $TiCl_4$ vapor at 3–5 p. s. i. created therein, similar to the manner described in Example I. Magnesium in the form of a continuous feed rod 7, 3.5" in diameter, was thereupon lowered into the reactor and through the $TiCl_4$ atmosphere to come in contact with the withdrawal plate insert. The latter was provided with associated means containing an electrically heated crucible or dish, activation of which heated the plate to about 800° C. Melting of the tip of the magnesium rod occurred due to its contact with the hot plate to initiate the desired reaction. As such reaction proceeded, the Mg melted upon being charged into the reaction zone 10 and resulted in formation out of contact with the cool walls of the reactor of a mound-like, columnar mass above the level of the liquid magnesium chloride byproduct which accumulates below the overflow or level of the efflux port 21 of the level control means 19. The ingot which thereby forms is withdrawn at the calculated rate as in Example I and until the retractor rolls 18 can be engaged therewith and the retractor plate released. In this instance it was desired to produce an ingot having 30% of its volume occupied by titanium metal. Previous experience had shown that a practical magnesium feed rate for this purpose was 2.5 pounds per minute or 150 pounds per hour. Using the simplified formula specific to this case:

$$W = \frac{P}{283AF},$$

a magnesium utilization of 95% and a 95% yield, the estimated production rate, P, calculated $$150 \times \frac{47.9}{48.6} \times .95 \times .95 \text{ or } 135\#/\text{hr.}$$

Using this value for P and neglecting minor volume effects due to unused Mg and lower Ti chlorides, and solving for W, $$W = \frac{135}{283 \times 1.22 \times .3} = 1.3 \text{ ft. per hr.}$$

These conditions of operation were established with TiCl4 supplied at 3 p. s. i. and after several hours' operation a 3-foot section of the ingot, weighing 690 pounds and occupying 3×1.22 or 3.68 cu. ft., was cut off for finishing. This ingot after vacuum treatment as in Example I resulted in the recovery of 315# of 99.5% pure, ductile titanium. The calculated volume of the metal was $$\frac{315}{283}$$

or 1.11 cu. ft. Hence, it occupied 1.11/3.68 or 30.2% of the ingot volume.

While described in its application to certain specific embodiments, the invention is not to be construed as limited thereto since recourse can be had to many variations without departing from its underlying principles and scope. In general, use of reaction temperatures approaching the boiling point of reaction by-product halide salt formed in the process can be employed. These can range from about 750–1450° C. but preferably are of the order of from about 1000–1150° C. Similarly, while titanium comprises a preferred metal for production hereunder by reducing a chloride thereof with a metal such as magnesium, other metals or mixtures thereof can be produced herein and other metal halides and reducing metals can be utilized in their production. For example, in addition to titanium, metals such as zirconium, columbium, hafnium, tantalum, molybdenum, tungsten, and the like, can be obtained, and in effecting production thereof the volatile halides, especially the chlorides, of all such metals can be used. The term "halides" means compounds the halogen components of which have an atomic number greater than 9, i. e., chlorine, bromine, or iodine. Chlorides preferred for use include TiCl4, ZrCl4, CbCl5, MoCl5, WCl6, TaCl5, etc. In addition to the preferred reducing metal, magnesium, various alkali metals and alkaline earth metals can be employed for such purpose. Among specifically useful metals of this type, calcium, sodium, strontium, barium, potassium, lithium, and cesium can be mentioned. Of these, magnesium, calcium, and sodium are preferred as reducing metals.

Again, while operatively useful in a batch, continuous or semi-continuous type of operation, the invention is particularly adapted for use in a continuous type method. In such instances, the reducing metal and metal halide reactants can be simultaneously introduced into the reactor and continuous withdrawal effected of the desired reaction products in solid form. In the preferred titanium metal operation, advanageously the frozen magnesium chloride reaction product shrinks slightly by reason of the cooling effect thereon by the cooled wall reactor to thereby permit use of an open-bottomed reactor and withdrawal of a solid retractible ingot containing the denser form of solidified titanium metal which inherently results from the process.

It will also be understood that the operation yielding the novel salt-metal ingots of this invention can be varied considerably. For example, the reducible halide can be introduced to the reactor in the form of liquid, gas, or solid, and the reducing metal can be introduced as solid or liquid or even, in some instances, as a vapor. The apparatus construction is also variable, although, preferably, resort is had to a heated over-flow pipe or conduit connected below the reaction zone to maintain the contemplated constant salt level. This permits the walls of the reactor adjacent the reaction zone to be cooled and maintained below the melting point of by-product salt formed so that undesired reaction between the product metal and the reactor will be prevented. If desired, and to provide and maintain a liquid communication between the reaction zone and overflow or level controlling means, a plurality of cooled zones can be resorted to, as contemplated in Fig. 2. External heat can be applied below the reaction zone, if desired, but it is also possible to restrict the upper cooling so that the heat of reaction will maintain the desired liquid communication between the reactor interior and side arm withdrawal outlet in relatively large reactors. Furthermore, the apparatus can be modified to enclose the upper part of the reactor, reaction zone, and level controlling means within a suitable furnacing apparatus or oven to prevent any solidification of the by-product salt from occurring within this section of the apparatus. In such instances, the cooled wall section can be entirely eliminated above the constant level outlet. Also, recourse to a plurality of liquid level control means or outlets for by-product salt from the reactor can be had. This is especially useful in batch types of operations where the means can be disposed at varying reactor levels and successively brought into use as the reaction zone and products rise within the reactor during the reduction cycle.

As shown in Fig. 1, the reaction can be fed by means of a continuous rod of reducing metal. In such instance, advantageously, titanium sponge will build up in the form of core and out of contact with the reactor walls, to therefore be free to be drawn down through the molten by-product salt into the cooled lower section. These walls usually are not cooled but in instances of large equipment or vigorous reaction they can be cooled only to temperature above the melting pint of the salt for the purposes of preventing heat distortion and chemical attack. As a result of these relatively hot walls, the reaction zone will approach the maximum temperature, namely the boiling point of the by-product salt. In this respect it is sometimes feasible to raise the reaction zone temperature further by operating under pressure, thereby affording production of a sponge of even higher, increased density. Such dense sponges are the result of effecting their formations above the by-product salt level, resorting to a relatively slow, controlled and correlated withdrawal of the ingot, and the increased mobility of the metal which causes consolidation and exudation of molten salt.

Various means for controlling ingot withdrawal can be used. In semi-continuous operations the salt-metal ingot can be withdrawn by means of a long screw-like element as shown in Figure 2. For continuous operations, recourse to serrated rolls or gears as shown in Figure 1 can be had. Resort to other devices such as reciprocating jaws can also be had. The rate at which these devices withdraw the ingot is controlled, according to the invention, to coordinate with the production rate as previously mentioned. The production rate can be followed for purposes of control by metering the consumption of reducible halides, particularly when fed in a fluid state. It is also possible to regulate the withdrawal rate with respect to the magnesium or other reducing metal input rate. This method is particularly desirable when feeding halides in the solid state.

The cross-section or shape of the salt-metal ingot produced in the invention is not limited, e. g., it can be circular, square, rectangular, etc., but usually a cylindrical form is preferred. It is also advantageous to increase the diameter of the apparatus very slightly toward the discharge end. This flaring or enlarging of the apparatus is particularly advantageous if located between the hot section associated with the side-arm and the cooled jacketed section below it (Fig. 2). In the absence of this flaring, there may occur a marked tendency for the product ingot to extend into the bulge of the hot zone to render ingot withdrawal difficult. The composition of the ingot can vary. Voids can exist therein, as can appreciable amounts of unreacted reducing metal and intermediate products, such as lower halides of the refractory metal under production.

The present process provides a metal product sponge which advantageously has a higher ratio of metal to by-product salt than is obtained from prior non-segregating processes. In its preferred adaptation, the relatively dense sponge is formed in the reaction zone just above the level of the fluid by-product salt due to the maintenance of such reaction zone above said level and the controlled withdrawal of the ingot at a slower than normal rate. This slower than normal rate means that the by-product salt is not withdrawn as fast as it is produced and a portion of it must escape by way of the constant level device. The titanium metal sponge being laid down on or near the salt surface becomes more dense than normally because less by-product salt is present to extend it. Although generally the ingot withdrawal rate hereinabove referred to can be utilized in the invention, preferably, to obtain optimum benefits, recourse is had to a rate defined by the relationship $$W = \frac{P/A}{283.4 F_v}$$

where:

$W$ = withdrawal rate in feet per hour
$P$ = pounds Ti made per hour
$A$ = area of ingot cross-section in square feet
$Fv$ = the fraction of the ingot volume occupied by the titanium metal and over the range where:

$F_v$ is between 0.12 and 0.9 and preferably between 0.25 and 0.60. In the description of the relationship between the withdrawal rate and the composition of the ingot, it has been assumed that complete reaction obtains and that only the product metal and by-product salt are formed in the ingot. In practice, an incomplete reaction may take place to result in the presence of minor quantities of reducing metal and of lower halides of the product metal. In the preferred operation of the invention, it will be found that the yield and reducing metal utilization is 90% or better so that the effect of the unreacted metal and intermediates on the withdrawal rate is for all practical purposes substantially negligible. However, if close control is desired, it is possible, knowing the nature of a given process, to make the minor adjustments associated with yield and utilization. Such adjustments are therefore considered within the scope of this invention.

The salt-metal ingot products of the invention may contain, as already noted, small voids or holes. These arise in part from the differential shrinking of the metal and the salt during cooling after solidification. They may also result from gaseous bubble formation in the reaction zone. In calculating the desired rate of withdrawal, the effect of these voids can be taken into account. Thus, under a given set of conditions the apparent or bulk salt density can be determined and used as indicated in the foregoing general formula. The symbol $F_v$, the fraction of the ingot volume occupied by the metal product, contains this correction.

It will thus be apparent that the invention advantageously provides a novel, continuous process for reducing a volatile halide of a refractory metal in a reaction chamber provided with a molten by-product salt efflux port disposed at a predetermined level in association with the reactor, with the deposition of the product metal in a form of such dimensions that it can be continuously withdrawn from the reactor at a controlled rate which, on the average, is less than that required to remove the total products of reaction as fast as formed, and the product metal will advantageously contain a greatly reduced portion of solidified by-product salt.

The advantages afforded by the invention over prior methods are many. The metal sponge product is denser in form and therefore requires smaller equipment for subsequent handling. This is particularly valuable in instances where the sponge is purified by vacuum distillation which requires the use of very expensive vessels. The salt content of the product ingot obtained is markedly reduced and the bulk density of the sponge metal is increased from the normal value of 25.2#/cu. ft. to 71#/cu. ft., as shown in Example I, and from 31#/cu. ft. to 85#/cu. ft., as illustrated in Example II. The dense nature of the sponge renders it better suited to melting operations, especially by induction heating. In such state also it is less likely to become contaminated during subsequent processing due to the reduced surface which it presents.

Separation of as much as 90% to 92% of by-product salt from the sponge is realized in the invention and production is readily effected of metal sponge having a bulk density in excess of 50% of the normal metal density. From the point of view of removing the product metal from the reactor, the invention is also advantageous since adhesion of the product metal to the reactor wall is completely avoided. In preparing titanium in accordance with the preferred adaptation of the invention, wherein the reaction takes place in the presence of a relatively large amount of seemingly exposed sponge, one would normally expect to obtain either a considerable amount of the undesired lower chlorides of titanium or low utilization of the magnesium or other reductant metal. Surprisingly, this is not the case, since usually magnesium utilization is higher and lower chloride formation is relatively low.

I claim as my invention:

1. A process for producing a refractory metal selected from the group consisting of titanium, zirconium, columbium, hafnium, tantalum, molybdenum and tungsten, comprising reacting within a closed, externally-cooled reactor, and at a temperature ranging from about 750–1450° C., a volatile halide of said metal, the halogen component of which has an atomic number above 9, with a reducing metal selected from the group consisting of magnesium and alkali and alkaline earth metals, during the reaction continuously charging said reducing metal into the reactor out of contact with its internal walls and maintaining said walls at a temperature below the melting point of the reducing metal by-product halide salt formed in the process, continuously withdrawing by-product salt from the reactor through a heated withdrawal outlet to maintain in said reactor a substantially constant liquid level of molten by-product salt at a point intermediate along its cooled wall surface, withdrawing from said reactor as a solidified mass sponge metal reaction product formed therein and subjecting the withdrawn mass to purification treatment.

2. A process for producing a refractory metal selected from the group consisting of titanium, zirconium, columbium, hafnium, tantalum, molybdenum and tungsten, comprising reacting within a closed, externally-cooled reactor and at a temperature ranging from about 750–1450° C., a volatile chloride of said metal, with a reducing metal selected from the group consisting of magnesium and alkali and alkaline earth metals, during the reaction continuously charging said reducing metal into the reactor out of contact with its internal walls and maintaining said walls at a temperature below the melting point of the reducing metal by-product chloride salt formed in the process, continuously withdrawing by-product salt from the reactor through a heated withdrawal outlet to maintain in said reactor a substantially constant liquid level of molten by-product salt at a point intermediate along its cooled wall surface, withdrawing from said reactor as a solidified mass sponge metal reaction product formed therein and subjecting the withdrawn mass to purification treatment.

3. A process for producing titanium metal comprising reacting a volatile chloride of titanium within a closed, externally-cooled reactor and at a temperature ranging from about 750–1450° C., with a reducing metal selected from the group consisting of magnesium and alkali and alkaline earth metals, during the reaction continuously charging said reducing metal into the reactor out of contact with its internal walls and maintaining said walls at a temperature below the melting point of the reducing metal by-product chloride salt formed in the process, continuously withdrawing by-product salt from the reactor through a heated withdrawal outlet to maintain in said reactor a substantially constant liquid level of molten by-product salt at a point intermediate along its cooled wall surface, withdrawing from said reactor as a solidified mass sponge metal reaction product formed therein and subjecting the withdrawn mass to purification treatment.

4. A process for producing titanium metal comprising reacting within a closed, externally-cooled reactor and at a temperature ranging from about 750–1450° C., titanium tetrachloride with magnesium, during the reaction continuously charging said reducing metal into the reactor out of contact with its internal walls and maintaining said walls at a temperature below the melting point of the magnesium chloride by-product salt formed in the process, continuously withdrawing by-product salt from the reactor through a heated withdrawal outlet to maintain in said reactor a substantially constant liquid level of molten by-product salt at a point intermediate along its cooled wall surface, withdrawing from said reactor as a solidified mass sponge metal reaction product formed therein and subjecting the withdrawn mass to purification treatment.

5. A process for producing titanium metal comprising reacting titanium tetrachloride with magnesium within a closed, externally-cooled reactor at a temperature ranging from about 1000–1150° C., during the reaction continuously charging the magnesium into the reactor out of contact with the internal walls of the latter and maintaining said walls at a temperature below the melting point of by-product magnesium chloride formed in the reaction, continuously withdrawing said by-product salt from the reactor through a heated withdrawal outlet and maintaining a substantially constant liquid level of said salt within the reactor at a point substantially intermediate along the cooled wall surface of the reactor, withdrawing the titanium sponge reaction product formed as a solid ingot mass from the reactor, and subjecting the withdrawn sponge product to purification treatment to recover the desired titanium metal product.

6. A process for producing titanium metal comprising reacting at temperatures ranging from 750–1450° C. titanium tetrachloride with magnesium within a closed, externally-cooled reactor, during the reaction continuously charging the magnesium into the reactor out of contact with the internal walls of the latter and maintaining said walls at a temperature below the melting point of the by-product magnesium chloride formed in the reaction, continuously withdrawing said by-product chloride from the reactor through a heated withdrawal outlet to maintain a substantially constant level of molten magnesium chloride therein and at a point substantially intermediate along the cooled wall surfaces of said reactor, during the reaction withdrawing from the reactor titanium metal sponge reaction product formed therein as a solidified ingot mass, and subjecting the withdrawn sponge product to vacuum distillation to recover the desired pure titanium metal product.

7. A process for producing titanium metal comprising reacting titanium tetrachloride at temperatures ranging from about 750–1450° C. with a reducing metal selected from the group consisting of magnesium and alkali and alkaline earth metals, effecting said reaction within the reaction zone of a closed, externally-cooled reactor, during the reaction continuously charging said reducing metal into the reactor out of contact with the internal walls of the latter and maintaining a substantially constant level of molten by-product chloride salt within the reactor at a point intermediate along its cooled wall surface by continuously withdrawing said by-product chloride salt from the reactor through a heated withdrawal outlet therefor, concurrently maintaining the walls of the latter adjacent said reaction zone and immediately above and below said by-product salt level at a temperature below the melting point of said by-product salt, withdrawing titanium sponge reaction product formed in the reactor as a solid ingot mass, and subjecting the withdrawn sponge product to purification treatment.

8. A process for producing titanium metal comprising reacting titanium tetrachloride within a closed, externally-cooled reactor at a temperature ranging from about 750–1450° C. with solid magnesium charged in the form of a continuous rod into the reaction zone of said reactor and out of contact with the walls of the latter, during the reaction maintaining said walls at a temperature below the melting point of magnesium chloride formed in the reaction and depositing the resulting sponge metal reaction product within said reactor as a columnar mass above a substantially constant liquid level of molten by-product magnesium chloride maintained in said reactor at a point intermediate along the cooled wall surfaces of the latter by continuously withdrawing said by-product through a heated withdrawal outlet from said reactor, withdrawing from said reactor as a solid ingot mass sponge metal reaction product formed therein, and subjecting the withdrawn sponge to purification treatment.

9. A process for producing a refractory metal selected from the group consisting of titanium, zirconium, columbium, hafnium, tantalum, molybdenum and tungsten, comprising reacting within a closed, externally-cooled reactor and at a temperature ranging from about 750–1450° C. a volatile halide of said metal, the halogen component of which has an atomic number above 9, with a reducing metal selected from the group consisting of magnesium and alkali and alkaline earth metals, during the reaction continuously charging said reducing metal into the reactor out of contact with the internal walls of the latter and maintaining said walls at a temperature below the melting point of reducing metal by-product halide formed in the reaction, continuously withdrawing by-product salt from the reactor through a heated withdrawal outlet therefor to maintain said by-product salt in molten state at a predetermined level within the reactor and at a point intermediate along its cooled wall surface, separately withdrawing from the reactor product metal formed therein in association with a portion of said by-product salt in solid ingot form and at a controlled average rate less than that required to remove all of the reaction products from said reactor, and subjecting the withdrawn product metal to purification treatment to remove its by-product salt content and recover the refractory metal in purified state.

10. A process for producing titanium metal which comprises reacting at temperatures ranging from about 1000–1150° C. titanium tetrachloride with magnesium within a reaction zone of a closed, externally-cooled reactor, during the reaction continuously charging the magnesium metal into said reaction zone and out of contact with the internal walls of the reactor, maintaining said walls at a temperature below the melting point of the magnesium chloride by-product formed in the reaction and a substantially constant liquid level of said molten by-product within the reactor at a point intermediate along its cooled wall surfaces by continuously withdrawing a portion of said by-product as liquid effluent from the reactor through a heated withdrawal outlet therefor, separately withdrawing from the reactor, at a controlled rate and in the form of a solid ingot mass, titanium metal sponge reaction product formed together with a portion of said by-product magnesium chloride, and thereafter recovering the titanium metal from the withdrawn sponge product in relatively pure condition.

11. A method for producing a solid, denser form of refractory metal reaction product selected from the group consisting of titanium, zirconium, columbium, hafnium, tantalum, molybdenum and tungsten which comprises reacting at an elevated temperature ranging from about 750–1450° C. a volatile metal halide, the halogen component of which has an atomic number greater than 9, with a reducing metal selected from the group consisting of magnesium and alkali and alkaline earth metals within a closed externally cooled reactor, during the reaction while continuously charging said reducing metal into the reactor out of contact with its internal walls and maintaining a substantially constant liquid level of molten by-product halide salt in molten state and in said reactor at a point intermediate along the cooled wall surface of said reactor by continuously withdrawing a portion of said molten by-product salt from the reactor through a heated withdrawal outlet therefor, and while the walls of said reactor are maintained at a temperature below the melting point of said by-product salt, and withdrawing the resulting sponge metal reaction product as a solidified ingot mass from said reactor at a rate, in relationship to the production rate, which accords with the formula:

$$W = \frac{P/A}{62.4 D_M} \times \frac{\frac{mQ}{d_M} + \frac{nS}{d_{NX_y}}}{\frac{mQ}{d_M}}$$

where:
W is the withdrawal rate in feet per hour,
P is the metal production rate in pounds per hour,
A is the area of the ingot cross section perpendicular to the direction of withdrawal in square feet,
$D_M$ is the specific gravity of the product metal,
m is pound equivalents of metal produced per hour,
Q is the equivalent weight of the product metal element,
n is pound equivalents of by-product salt entering the ingot per hour,
S is the equivalent weight of the by-product salt, i. e., the formula weight of the salt divided by the valence of the cation,
$d_M$ is the density of the product metal in pounds per cubic foot,
$d_{NX_y}$ is the apparent density of the by-product salt in pounds per cubic foot,
and W is within the range determined by values of $n/m$ and are less than one.

12. A process for producing metallic titanium comprising reducing at temperatures ranging from about 1000–1150° C. titanium tetrachloride with metallic magnesium within a closed reaction chamber the walls of which are maintained by external cooling at a temperature below the melting point of by-product $MgCl_2$ formed in the reduction, effecting the reaction by continuously charging during the reaction said reducing metal into the reactor out of contact with the internal walls of the latter and while maintaining a substantially constant level of molten magnesium chloride within the reactor at a point intermediate along the cooled wall surface of the reactor by continuously withdrawing a portion of said by-product in liquid state from said reactor by continuously withdrawing a portion of said molten by-product $MgCl_2$ from the reactor through a heated withdrawal outlet therefrom, withdrawing solidified titanium metal products of the reaction in ingot mass state at a rate defined by the relationship $$W = \frac{P/A}{283.4 F_v}$$

where W is the withdrawal rate in feet per hour, P is pounds of titanium metal produced per hour, A is the area of the ingot cross-section normal to the direction of withdrawal in square feet, $F_v$ is the fraction of the ingot volume occupied by the titanium metal, 283.4 is the weight in pounds of one cubic foot of titanium, and W is limited to the range where $F_v$ is between 0.12 and 0.9, and recovering the titanium metal content of the product ingot thus obtained.

References Cited in the file of this patent
UNITED STATES PATENTS

| | | |
|---|---|---|
| 2,607,674 | Winter | Aug. 19, 1952 |
| 2,621,121 | Winter | Dec. 9, 1952 |